(12) United States Patent
Diehl (10) Patent No.: US 11,398,039 B2
(45) Date of Patent: Jul. 26, 2022

(54) POINT CLOUD SCRAMBLING

(71) Applicants: Sony Corporation, Tokyo (JP); Sony Pictures Entertainment Inc., Culver City, CA (US)

(72) Inventor: Eric Diehl, Culver City, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 437 days.

(21) Appl. No.: 16/684,956

(22) Filed: Nov. 15, 2019

(65) Prior Publication Data

US 2021/0150738 A1 May 20, 2021

(51) Int. Cl.
| | |
|---|---|
| *G06K 9/00* | (2022.01) |
| *G06T 7/30* | (2017.01) |
| *H04L 9/30* | (2006.01) |
| *G06F 17/16* | (2006.01) |
| *H04L 9/08* | (2006.01) |

(52) U.S. Cl.
CPC .............. *G06T 7/30* (2017.01); *G06F 17/16* (2013.01); *H04L 9/0869* (2013.01); *H04L 9/3033* (2013.01); *G06T 2207/10028* (2013.01)

(58) Field of Classification Search
CPC .......................................... G06T 2207/10028
See application file for complete search history.

(56) References Cited

U.S. PATENT DOCUMENTS

| | | | |
|---|---|---|---|
| 2013/0202197 A1 | 8/2013 | Reeler et al. | |
| 2018/0114289 A1* | 4/2018 | Lee ........................ | B33Y 10/00 |
| 2018/0197329 A1 | 7/2018 | Palais | |
| 2019/0088034 A1 | 3/2019 | Anderson | |
| 2020/0372228 A1* | 11/2020 | Rodriguez ........... | G06Q 20/203 |
| 2020/0380226 A1* | 12/2020 | Rodriguez ......... | G06V 30/2247 |

FOREIGN PATENT DOCUMENTS

| | | |
|---|---|---|
| CN | 104484852 A | 4/2015 |
| CN | 106301760 A | 1/2017 |
| CN | 107896144 A | 4/2018 |
| EP | 2725566 A1 | 4/2014 |

OTHER PUBLICATIONS

S. S. Pawar and S. Nandusekar, "Improvised image scrambling technique with shuffling of pixel values and position," 2016 International Conference on Communication and Electronics Systems (ICCES), 2016, pp. 1-5, doi: 10.1109/CESYS.2016.7889836. (Year: 2016).*

Jolfaei et al., "A 3D Object Encryption Scheme Which Maintains Dimensional and Spatial Stability", IEEE Transactions On Information Forensics and Security, vol. 10, No. 2, Feb. 2015, 14 pages.

* cited by examiner

*Primary Examiner* — Hadi Akhavannik

(74) *Attorney, Agent, or Firm* — Procopio, Cory, Hargreaves & Savitch LLP (57) ABSTRACT

Scrambling a point cloud (PC), including: receiving the PC in polar coordinates, wherein each point of the PC includes an index; scrambling each point of the PC by translating each point along a radial axis of the polar coordinates by adding a pseudo-random number (PRN) to each point, wherein the PRN is generated using the index and a secret key.

20 Claims, 7 Drawing Sheets

POINT CLOUD SCRAMBLING

BACKGROUND

Field

The present disclosure relates to point cloud, and more specifically, to secure distribution of point clouds.

Background

A point cloud (PC) is a set of data points in space, which provides a new method to describe a 3-dimensional (3-D) object or landscape. Thus, the PC, as a digital asset, has an intrinsic value, which can be subject to piracy if not adequately protected. However, overprotecting the PC from piracy may make it difficult to sample the PC prior to purchasing it. Therefore, it may be of interest to provide a "lower quality" PC that gives a hint of the visual aspect, density of points, and other geometrical aspects of the PC without sacrificing the security of the PC.

SUMMARY

The present disclosure provides for protecting the point cloud (PC) without sacrificing the security of the PC by providing the customers with "lower quality" PCs.

In one implementation, a system for scrambling a point cloud (PC) is disclosed. The system includes: a secret key; and a value calculator configured to scramble each point of the PC in polar coordinates by translating each point along a radial axis of the polar coordinates by a value that is deterministically random, wherein each point of the PC includes an index, and wherein the value is generated using the index and the secret key.

In one implementation, the system further includes an interface configured to appropriately format an output of the value calculator as a scrambled PC. In one implementation, the system further includes a transformer configured to receive and transform the PC to polar coordinates prior to translation. In one implementation, the value is generated by a pseudo-random number (PRN) generator. In one implementation, the value calculator is an implementation of an affine mathematical function. In one implementation, the PRN generator is a cryptographically secure random number generator seeded by the secret key.

In another implementation, a method for scrambling a PC is disclosed. The method includes: receiving the PC in polar coordinates, wherein each point of the PC includes an index; scrambling each point of the PC by translating each point along a radial axis of the polar coordinates by adding a pseudo-random number (PRN) to each point, wherein the PRN is generated using the index and a secret key.

In one implementation, the PRN is generated by a PRN generator initiated using the secret key as a seed. In one implementation, the system further includes appropriately formatting all translated points of the PC. In one implementation, the system further includes aggregating the appropriately formatted points of the PC as a scrambled PC. In one implementation, scrambling each point of the PC includes scrambling the PC such that a shape of the scrambled PC to be lower in fidelity and visual aspect than a shape of the PC, but preserves some hints of the shape of the PC. In one implementation, translating each point along the radial axis of the polar coordinates implements an affine mathematical function.

In another implementation, a method for descrambling a scrambled point cloud (PC) is disclosed. The method includes: descrambling each point of the scrambled PC by translating each point along a radial axis of the polar coordinates by subtracting a pseudo-random number (PRN) from each point, wherein the PRN is generated using the index and a secret key used for a scrambling process; and outputting a descrambled PC once all points of the scrambled PC have been descrambled.

In one implementation, said subtracting the PRN from each point is in an opposite direction along the radial axis of the polar coordinates from the scrambling process. In one implementation, the PRN is generated by a PRN generator initialized by the secret key used for the scrambling process. In one implementation, said descrambling also receives a maximum value of the PRN.

In another implementation, a non-transitory computer-readable storage medium storing a computer program to descrambling a scrambled point cloud (PC) is disclosed. The computer program includes executable instructions which cause a computer to: descramble each point of the scrambled PC by translating each point along a radial axis of the polar coordinates by subtracting a pseudo-random number (PRN) from each point, wherein the PRN is generated using the index and a secret key used for a scrambling process; and output a descrambled PC once all points of the scrambled PC have been descrambled.

In one implementation, the subtraction of the PRN from each point is in an opposite direction along the radial axis of the polar coordinates from the scrambling process. In one implementation, the PRN is generated by a PRN generator initialized by the secret key used for the scrambling process. In one implementation, the executable instructions which cause the computer to descramble receive a maximum value of the PRN.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, overprotecting the point cloud (PC) from piracy may make it difficult for a legitimate purchaser to sample the PC prior to purchasing it. Thus, it may be of interest to provide a "lower quality" PC for evaluation without sacrificing the security of the PC. The term "lower quality" as used herein refers to lower in fidelity and visual aspect than the "full quality" PC.

Certain implementations of the present disclosure provide for protecting the PC without sacrificing the security of the PC by providing the customers with "lower quality" PCs. The protected "lower quality" PC also enables the current renderers to render the protected PC without having access to the "full quality" PC. The "full quality" PC would be made accessible only to the authorized user/purchaser.

In one implementation, the scrambling process is designed to preserve the order of the points of the PC and the scrambled PC. To make this possible, the scrambling process operates in spherical or polar coordinates (azimuth, elevation, radius), while preserving the order of the scrambled points. Although, in some rare cases, the order may be inverted, the descrambled points would still be near the original points to make the visual impact negligible.

After reading these descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Figure 1:
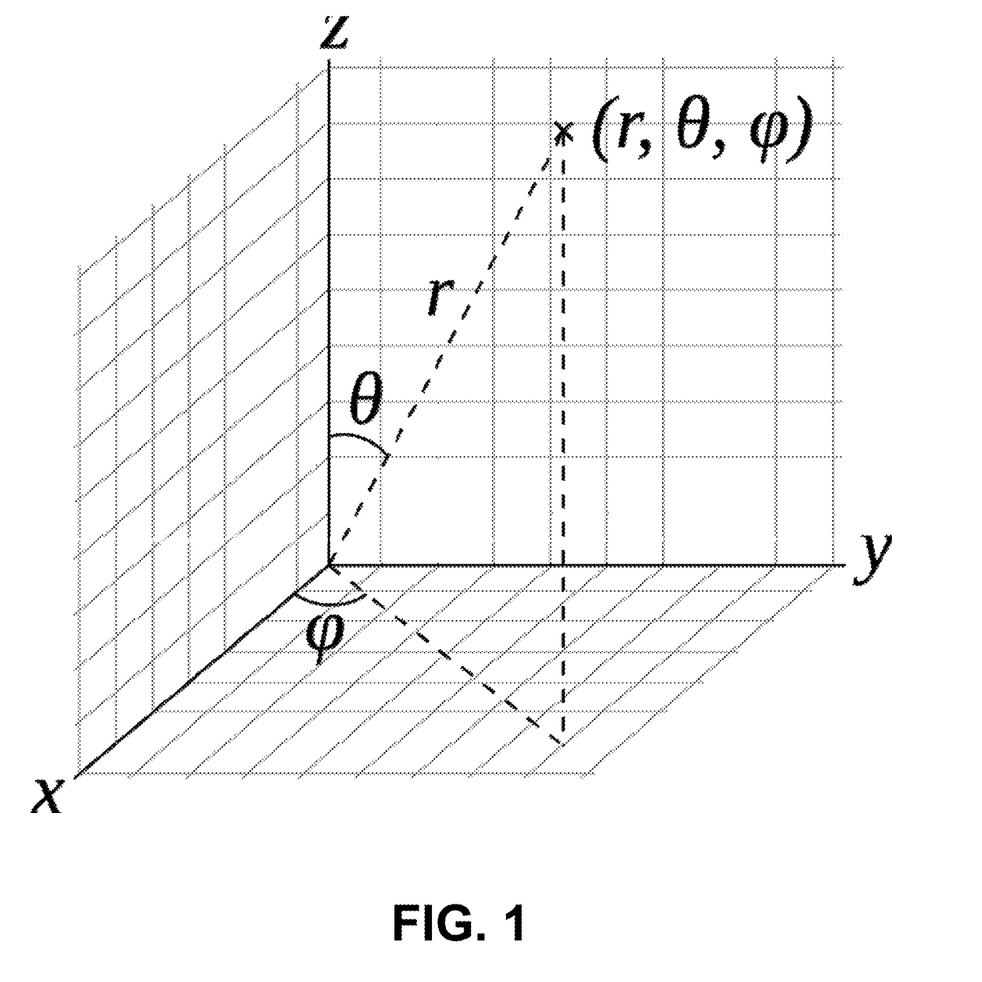
FIG. 1 is an illustration of a spherical coordinate system in which the scrambling process operates.

FIG. 1 is an illustration of a spherical coordinate system in which the scrambling process operates. Thus, each point of the PC is described by its polar coordinates ($\theta$, $\varphi$, r). The elevation ($\theta$) represents the angle in radians with respect to the z-axis. The azimuth ($\varphi$) represents the angle in radians with respect to the x-axis. The radius (r) represents the distance of the point from the origin point.

In one implementation, the scrambling process translates each point of the PC along its radial axis (r) by a value, wherein the value is defined by a number generated by a pseudo-random number (PRN) generator. Further, the PRN generator is initialized by a secret key (K) as a seed. The corresponding new point is referred to as the scrambled point. Thus, the descrambling process translates each scrambled point along its axis by a distance in the other direction that is defined by the PRN generator initialized by the secret key (K) used for the scrambling process.

Figure 2:
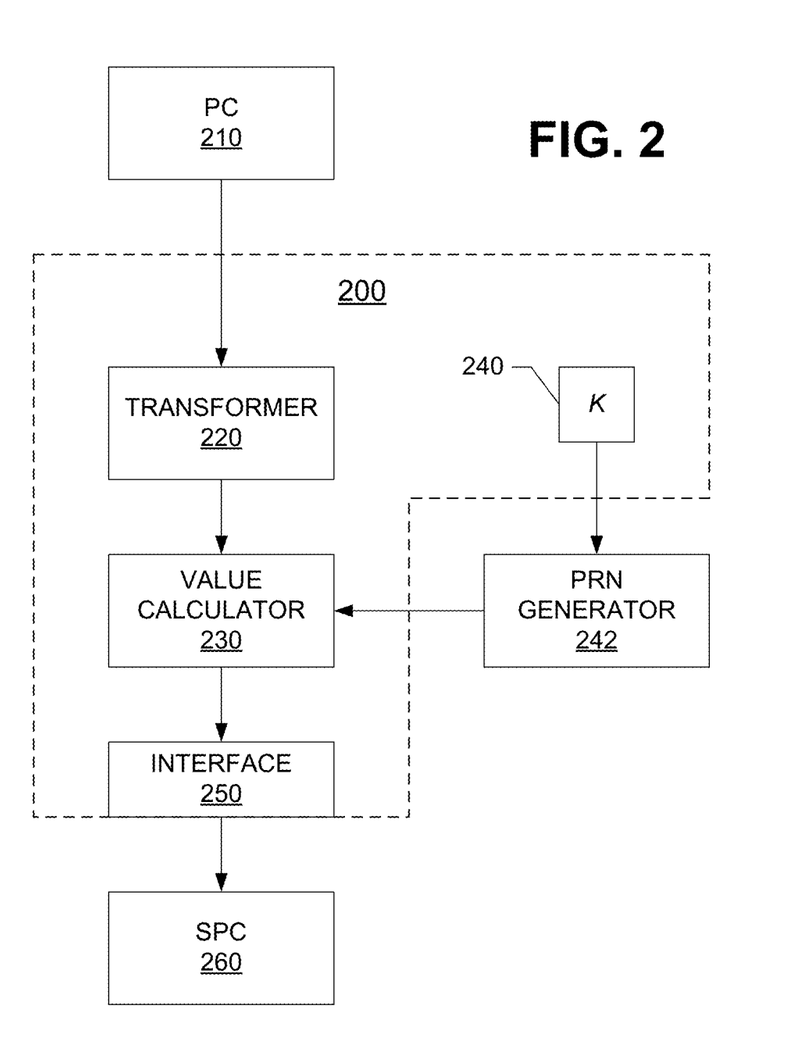
FIG. 2 is a block diagram of a PC scrambling system in accordance with one implementation of the present disclosure.

FIG. 2 is a block diagram of a PC scrambling system 200 in accordance with one implementation of the present disclosure. In the illustrated implementation of FIG. 2, the PC scrambling system 200 includes a transformer 220, a value calculator 230, a secret key 240 used to generate a pseudo-random number (PRN), and an interface 250. The PRN is generated by the PRN generator 242.

In one implementation, the transformer 220 receives each point of the PC 210. The transformer 220 transforms the coordinates (e.g., Cartesian coordinates x, y, z) of each point to the polar coordinates (r, $\theta$, $\varphi$). If each point is already in the polar coordinates, the transformer 220 passes each point along to the next stage without transforming.

In one implementation, the value calculator 230 receives each point of the PC 210 in polar coordinates and translates the amplitude of each point along the radial axis (r). The value calculator 230 translates each point along the radial axis of the plar coordinate using a PRN generated by the PRN generator 242. The PRN is generated by the PRN generator 242 using index i of each point and initiated by the secret key (K) 240. Once all points of the PC 210 have been scrambled by the PC scrambling system 200, the output is appropriately formatted by the interface 250 and is output as the scrambled PC 260, which can be distributed to the potential purchasers, renderers, and/or other interested parties. In one implementation, the appropriate format of the output is the format that can be used by the receiver of the output 260.

In one implementation, the value calculation process performed by unit 230 is described herein. The PC is a set of points, wherein each point $P_i$ has the coordinates $P_i = \{r_i, \theta_i, \varphi_i\}$. The corresponding scrambled point $P'_i$ has the coordinates $P'_i = \{r'_i, \theta'_i, \varphi'_i\}$.

The scrambling step can be described as:

$$\begin{cases} r'_i = r_i + s(PRNG(i, K)) \\ \theta'_i = \theta_i \\ \varphi'_i = \varphi_i \end{cases} \quad [1]$$

where s is an value calculation function that defines the value of the translation along the radial axis (r). The input is the PRN generator output using index i of point $P_i$ and the secret key K. Thus, each point is translated with different value that is deterministically random (i.e., pseudo-random).

The descrambling step can be described as:

$$\begin{cases} \rho_i = \rho'_i + s(PRNG(i, K)) \\ \theta_i = \theta'_i \\ \varphi_i = \varphi'_i \end{cases} \quad [2]$$

In one implementation, the value calculator 230 is an affine mathematical function in the form $s = a + b \times PRNG(i,K)$. The PRNG generator 242 can be any cryptographically secure, seeded random number generator. In one implementation, the PRN generator 242 is based on the Advanced Encryption Standard in counter mode (AES CTR) as described below:

$$PRNG(i,K) = lsb(AES_{(K)}(i\|IV)), \quad [3]$$

where lsb extracts the least significant byte and IV is a fixed 64-bit value defined arbitrarily by the system.

In one implementation, $$a = 0 \text{ and } b = \frac{m}{256},$$

where m is a fixed value defined by the designer. In this implementation, the value calculator 230 is represented as $$s = \frac{m \times lsb(AES_{\{K\}}(i\|IV))}{256}.$$

Thus, in this implementation, the possible position of the scrambled point is moved outside of the current shape at a maximum value of m and the object is expanded. Therefore, the needed information for the descrambling step is the secret key K and the index i of the scrambled point.

In another implementation, $$a = -\frac{m}{128} \text{ and } b = \frac{m}{256}$$

where m is a fixed value defined by the designer. In this implementation, the value calculator 230 is represented as $$= \frac{m \times lsb(AES_{\{K\}}(i\|IV))}{256} - \frac{m}{128}.$$

Thus, in this implementation, the possible position of the scrambled point is centered about each point at maximum amplitude of m/2. The scrambled PC expands outside from a distance m/2. Again, the needed information for the descrambling step is the secret key K and the index i of the scrambled point.

As described above, one of the goals of the present scrambling process was to preserve some hints on the original shape of the PC. Toward this goal, the choice of m may be tricky. If m is too large, the PC may "expand" too much for a small object, and conversely, if m is too small, the visual impact may be too low for large objects.

In a third implementation, the scrambling is made "parametrizable". That is, the scrambling step uses an additional parameter referred to as scale, which is in the range from 0 to 1. Therefore, the scrambling step is now described as $$s = \frac{amp \times lsb(AES_{\{K\}}(i\|IV))}{256} - \frac{amp}{2} = amp \times \frac{lsb(AES_{\{K\}}(i\|IV)) - 128}{256}, \quad [4]$$

where $\max(r_{0\ldots n})$ returns the maximum radius of the PC. In that case, the scrambled point is moved around the secret key K from a maximum of half of the scale of the maximum radius, which can be expressed as:

$$\begin{cases} amp = \text{scale} \times \max(r_{0\ldots n}) \\ r'_i = r_i + \text{scale} \times \max(r_{0\ldots n}) \times \frac{lsb(AES_{\{K\}}(i\|IV)) - 128}{256} \\ \theta'_i = \theta_i \\ \varphi'_i = \varphi_i \end{cases} \quad [5]$$

Thus, the needed information for the descrambling step is the secret key K, the index i of the scrambled point, and the maximum value amp. Although the scrambling step uses scale as a parameter, scale cannot be used as a parameter for the descrambling step because $$\max(r'_{0\ldots n}) \neq \left(1 + \frac{\text{scale}}{2}\right) \times \max(r_{0\ldots n})$$

due to the randomness of the translation.

It should be noted that the security requires only the secret key K to be secret. The parameter amp can be public without decreasing the security of the scrambling step.

In the above implementations, the value of the index of each point in the PC is essential. If the order is changed, then the descrambling step fails. The usual solution is that the PC and the scrambled PC preserve the order of the points. The scrambling steps of the above implementations have an advantage in that two coordinates, ϕ and θ, are invariant. Therefore, it is possible to order the points using the two invariant coordinates first. In cases in which two points have the same elevation and azimuth, the points are ordered with the increasing value of the radius.

Figure 3:
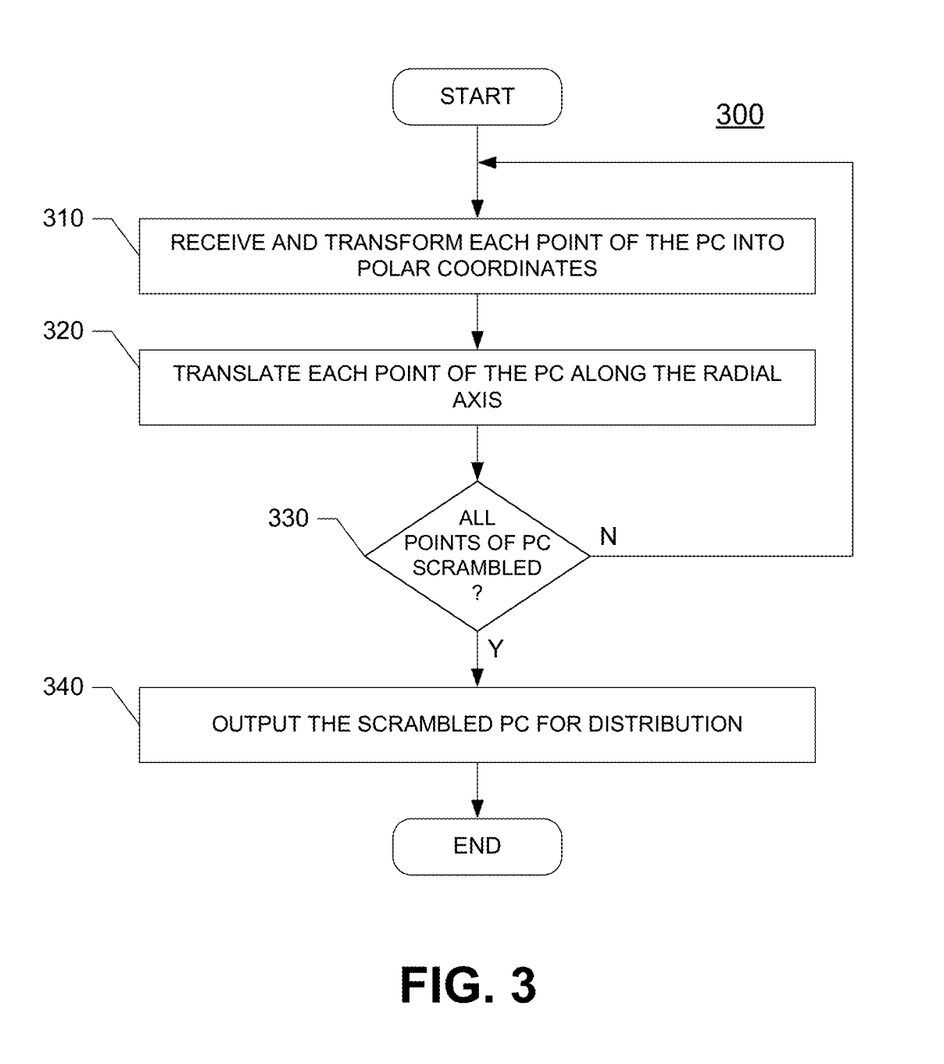
FIG. 3 is a flow diagram of a method for scrambling a PC in accordance with one implementation of the present disclosure.

FIG. 3 is a flow diagram of a method 300 for scrambling a PC in accordance with one implementation of the present disclosure. In the illustrated implementation of FIG. 3, the scrambling method was done to preserve some hints on the original shape of the PC.

In one implementation, the coordinates (e.g., Cartesian coordinates x, y, z) of each point is transformed, at block 310, to the polar coordinates (r, θ, φ). If each point is already in the polar coordinates, this transformation step 310 passes each point along to the next stage without transforming. The amplitude of each point is then translated, at block 320, along the radial axis (r). In one implementation, this step, at block 320, translates each point using index i of each point and a PRN generated by a PRN generator, which was initiated using the secret key (K). A check is made, at block 330, whether all points of the PC have been scrambled (i.e., transformed into the polar coordinates and amplitude translated along the radial axis). The scrambled PC is output, at block 340, when all points of the PC have been scrambled. The output can be distributed to the potential purchasers, renderers, and/or other interested parties.

Figure 4:
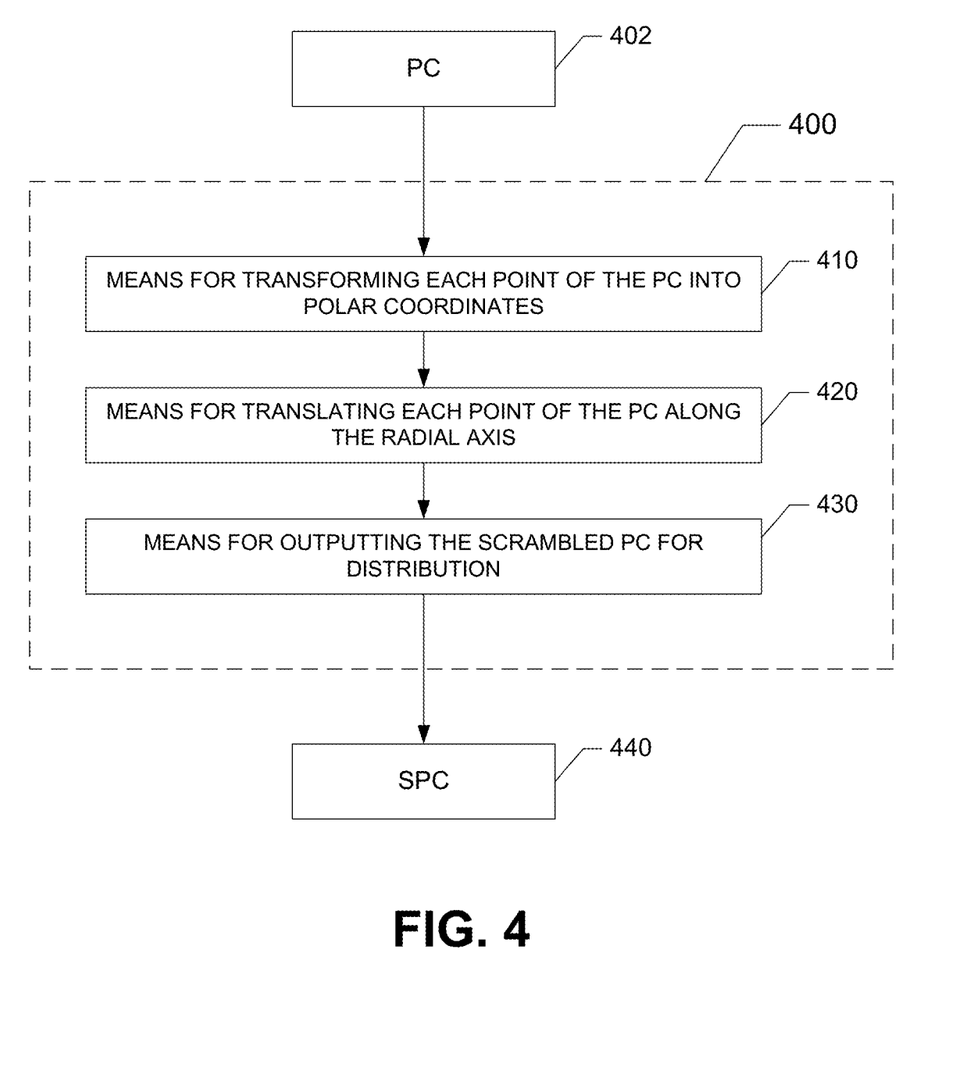
FIG. 4 is a block diagram of an apparatus for scrambling a PC in accordance with one implementation of the present disclosure.

FIG. 4 is a block diagram of an apparatus 400 for scrambling a PC in accordance with one implementation of the present disclosure. In the illustrated implementation of FIG. 4, the scrambling apparatus 440 includes means for transforming 410, means for translating each point 420, and means for outputting 430. The scrambling apparatus 440 is configured to preserve some hints on the original shape of the PC.

In one implementation, the means for transforming 410 transforms the coordinates (e.g., Cartesian coordinates x, y z) of each point to the polar coordinates (r, θ, φ). If each point of the PC is already in the polar coordinates, this unit 410 passes each point along to the next unit without transforming the PC.

In one implementation, the means for translating the amplitude 420 translates each point along the radial axis (r). This unit 420 uses index i of each point and a PP generated by a PRN generator. In one implementation, the means for translating each point 420 is configured as a value calculator using an affine mathematical function in the form s=a+b× PRNG(i,K). Further, the PRN generator is configured as a cryptographically secure, seeded random number generator using a secure key. In one implementation, the PRN generator is based on the Advanced Encryption Standard in counter mode (AES CTR).

In one implementation, the means for outputting 430 checks to make sure that all points of the PC have been scrambled (i.e., transformed into the polar coordinates and translated along the radial axis). The means for outputting 430 then outputs the scrambled PC to be distributed to the potential purchasers, renderers, and/or other interested parties.

Figure 5A:
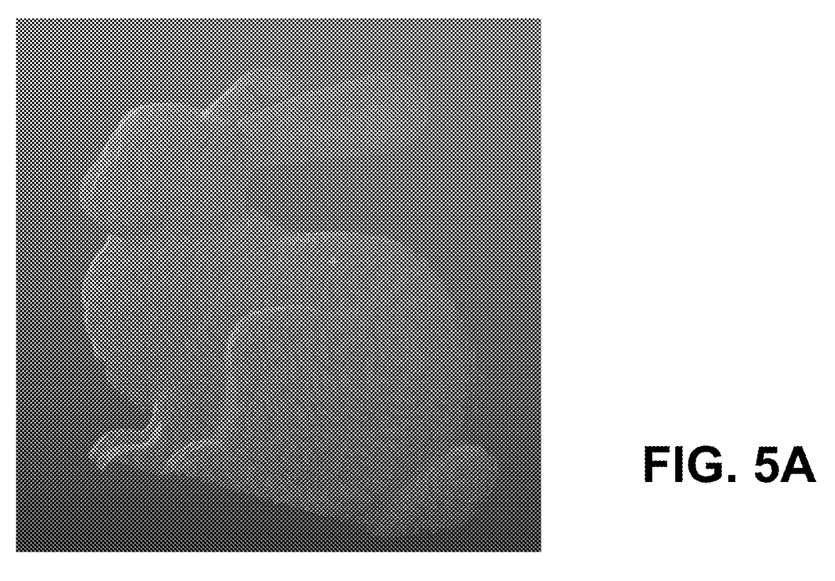
FIG. 5A is an example representation of a PC.
Figure 5B:
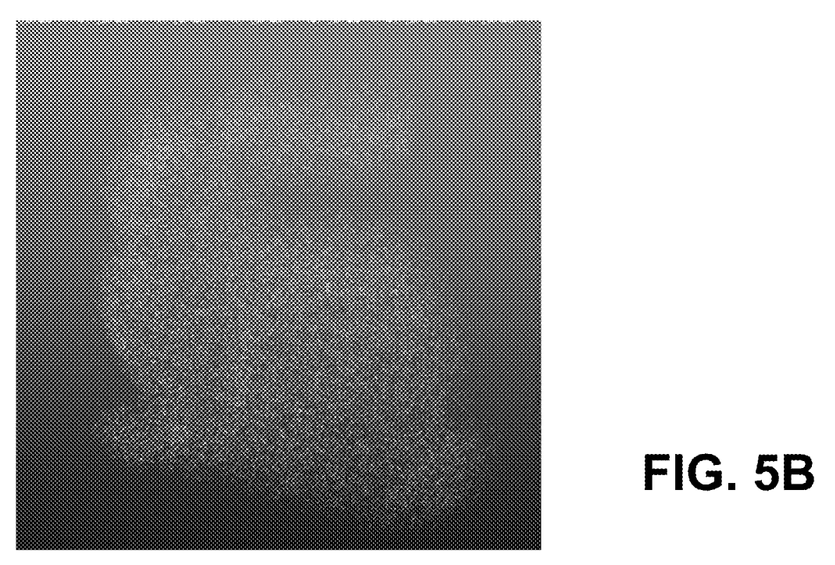
FIG. 5B is an example representation of a scrambled PC using the third implementation described above with scale=0.1.

FIG. 5A is an example representation of a PC, while FIG. 5B is an example representation of a scrambled PC using the third implementation described above with scale=0.1.

Figure 6:
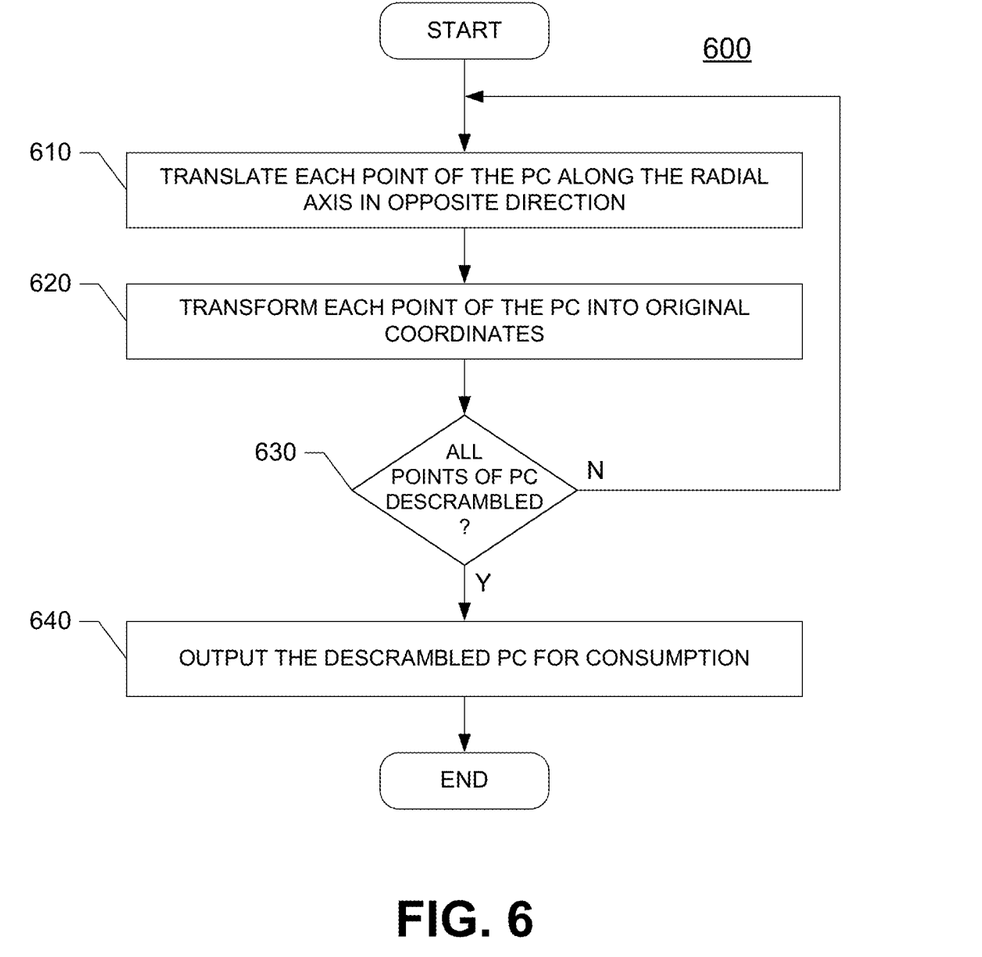
FIG. 6 is a flow diagram of a method for descrambling a scrambled PC in accordance with one implementation of the present disclosure.

FIG. 6 is a flow diagram of a method 600 for descrambling a scrambled PC in accordance with one implementation of the present disclosure.

In one implementation, each scrambled point is descrambled by translating, at block 610, along its radial axis by a distance in the opposite direction than the scrambling step (shown in Equation [1] above). The distance is defined by the PRN generator initialized by the same secret key (K) used for the scrambling step. Thus, the descrambling step can be described as:

$$\begin{cases} r_i = r'_i + s(PRNG(i, K)) \\ \theta_i = \theta'_i \\ \varphi_i = \varphi'_i \end{cases} \quad [6]$$

Therefore, in one implementation, the needed information for the descrambling step is the secret key K and the index i of the scrambled point. In the third implementation shown above, the needed information for the descrambling step is the secret key K, the index i of the scrambled point, and the maximum value (amp). Although the scrambling step uses scale as a parameter, scale cannot be used as a parameter for the descrambling step because $$\max(r'_{0\ldots n}) \neq \left(1 + \frac{scale}{2}\right) \times \max(r_{0\ldots n})$$

due to the randomness of the translation. Therefore, the mathematical definition of the descrambling step for this implementation is:

$$\begin{cases} r_i = r'_i - amp \times \dfrac{lsb(AES_{\{K\}}(i\|IV)) - 128}{256} \\ \theta_i = \theta'_i \\ \varphi_i = \varphi'_i \end{cases} \quad [7]$$

In one implementation, the polar coordinates (r, δ, φ) of each translated point is transformed, at block 620, to the original coordinates (e.g., Cartesian coordinates x, y, z). If the original coordinates of each point was the polar coordinates, this transformation step 620 passes each point along to the output without transforming. A check is made, at block 630, whether all points of the PC have been descrambled (i.e., translated along the radial axis and transformed into the original coordinates of the PC). The descrambled PC is output, at block 640, when all points of the PC have been descrambled.

Figure 7A:
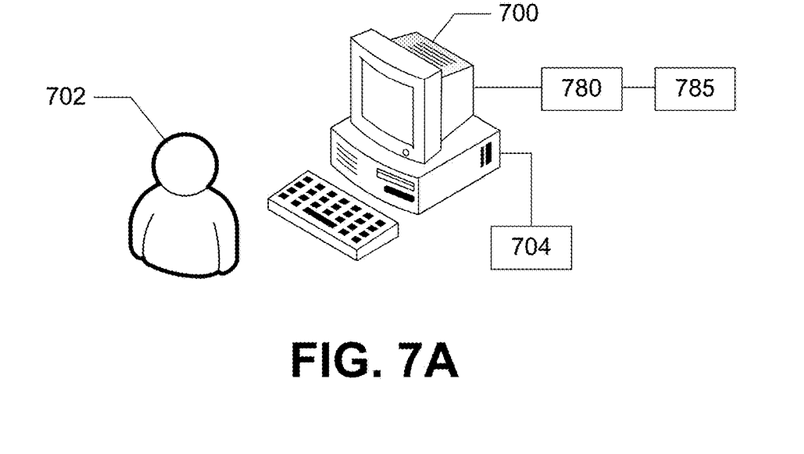
FIG. 7A is a representation of a computer system and a user in accordance with an implementation of the present disclosure.

FIG. 7A is a representation of a computer system 700 and a user 702 in accordance with an implementation of the present disclosure. The user 702 uses the computer system 700 to implement a PC scrambling application 790 as illustrated and described with respect to the PC scrambling system 200 of the block diagram shown in FIG. 2 and the method 300 illustrated in FIG. 3.

Figure 7B:
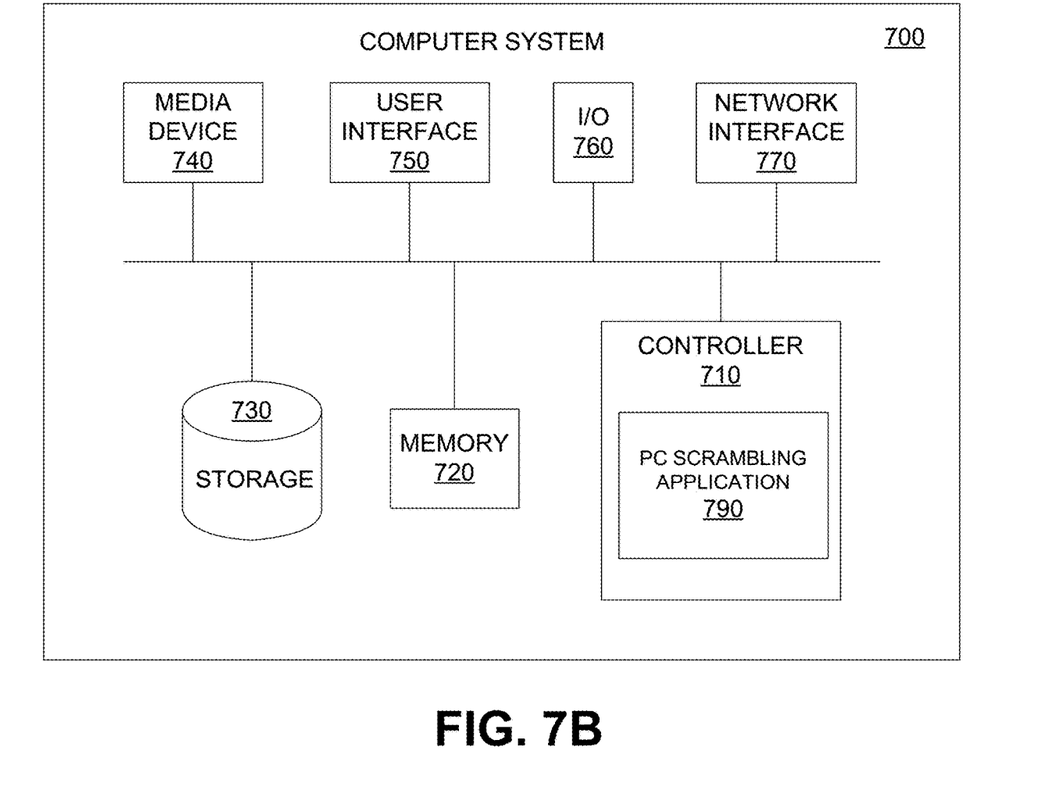
FIG. 7B is a functional block diagram illustrating the computer system hosting the PC scrambling application in accordance with an implementation of the present disclosure.

The computer system 700 stores and executes the PC scrambling application 790 of FIG. 7B. In addition, the computer system 700 may be in communication with a software program 704. Software program 704 may include the software code for the PC scrambling application 790. Software program 704 may be loaded on an external medium such as a CD, DVD, or a storage drive, as will be explained further below.

Furthermore, computer system 700 may be connected to a network 780. The network 780 can be connected in various different architectures, for example, client-server architecture, a Peer-to-Peer network architecture, or other type of architectures. For example, network 780 can be in communication with a server 785 that coordinates engines and data used within the PC scrambling application 790. Also, the network can be different types of networks. For example, the network 780 can be the Internet, a Local Area Network or any variations of Local Area Network, a Wide Area Network, a Metropolitan Area Network, an Intranet or Extranet, or a wireless network.

FIG. 7B is a functional block diagram illustrating the computer system 700 hosting the PC scrambling application 790 in accordance with an implementation of the present disclosure. A controller 710 is a programmable processor and controls the operation of the computer system 700 and its components. The controller 710 loads instructions (e.g., in the form of a computer program) from the memory 720 or an embedded controller memory (not shown) and executes these instructions to control the system. In its execution, the controller 710 provides the PC scrambling application 790 with a software system, such as to enable the creation and configuration of engines and data extractors within the PC scrambling application 790. Alternatively, this service can be implemented as separate hardware components in the controller 710 or the computer system 700.

Memory 720 stores data temporarily for use by the other components of the computer system 700. In one implementation, memory 720 is implemented as RAM. In one implementation, memory 720 also includes long-term or permanent memory, such as flash memory and/or ROM.

Storage 730 stores data either temporarily or for long periods of time for use by the other components of the computer system 700. For example, storage 730 stores data used by the PC distribution application 790. In one implementation, storage 730 is a hard disk drive.

The media device 740 receives removable media and reads and/or writes data to the inserted media. In one implementation, for example, the media device 740 is an optical disc drive.

The user interface 750 includes components for accepting user input from the user of the computer system 700 and presenting information to the user 702. In one implementation, the user interface 750 includes a keyboard, a mouse, audio speakers, and a display. The controller 710 uses input from the user 702 to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (including, but not limited to 802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).

In one implementation, the PC scrambling system 200 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the PC scrambling system 200 is configured with a combination of hardware and software. For example, the transformer 220 and the PRN generator 242 are configured with software residing within a separate processor, while the value calculator 230 is configured as hardware.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A system for scrambling a point cloud (PC), the system comprising:
   a secret key; and
   a value calculator configured to scramble each point of the PC in polar coordinates by translating each point along a radial axis of the polar coordinates by a value that is deterministically random,
   wherein each point of the PC includes an index,
   wherein the value is generated using the index and the secret key.

2. The system of claim 1, further comprising
   an interface configured to appropriately format an output of the value calculator as a scrambled PC.

3. The system of claim 1, further comprising
   a transformer configured to receive and transform the PC to polar coordinates prior to translation.

4. The system of claim 1, wherein the value is generated by a pseudo-random number (PRN) generator.

5. The system of claim 1, wherein the value calculator is an implementation of an affine mathematical function.

6. The system of claim 1, wherein the PRN generator is a cryptographically secure random number generator seeded by the secret key.

7. A method for scrambling a Point Cloud (PC), the method comprising:
   receiving the PC in polar coordinates,
   wherein each point of the PC includes an index;
   scrambling each point of the PC by translating each point along a radial axis of the polar coordinates by adding a pseudo-random number (PRN) to each point, wherein the PRN is generated using the index and a secret key.

8. The method of claim 7, wherein the PRN is generated by a PRN generator initiated using the secret key as a seed.

9. The method of claim 7, further comprising
   appropriately formatting all translated points of the PC.

10. The method of claim 9, further comprising
    aggregating the appropriately formatted points of the PC as a scrambled PC.

11. The method of claim 10, wherein scrambling each point of the PC comprises
    scrambling the PC such that a shape of the scrambled PC to be lower in fidelity and visual aspect than a shape of the PC, but preserves some hints of the shape of the PC.

12. The method of claim 7, wherein translating each point along the radial axis of the polar coordinates implements an affine mathematical function.

13. A method for descrambling a scrambled point cloud (PC), the method comprising:
    descrambling each point of the scrambled PC by translating each point along a radial axis of the polar coordinates by subtracting a pseudo-random number (PRN) from each point, wherein the PRN is generated using the index and a secret key used for a scrambling process; and
    outputting a descrambled PC once all points of the scrambled PC have been descrambled.

14. The method of claim 13, wherein said subtracting the PRN from each point is in an opposite direction along the radial axis of the polar coordinates from the scrambling process.

15. The method of claim 13, wherein the PRN is generated by a PRN generator initialized by the secret key used for the scrambling process.

16. The method of claim 13, wherein said descrambling also receives a maximum value of the PRN.

17. A non-transitory computer-readable storage medium storing a computer program to descrambling a scrambled point cloud (PC), the computer program comprising executable instructions which cause a computer to:
 descramble each point of the scrambled PC by translating each point along a radial axis of the polar coordinates by subtracting a pseudo-random number (PRN) from each point, wherein the PRN is generated using the index and a secret key used for a scrambling process; and
 output a descrambled PC once all points of the scrambled PC have been descrambled.

18. The non-transitory computer-readable storage medium of claim 17, wherein the subtraction of the PRN from each point is in an opposite direction along the radial axis of the polar coordinates from the scrambling process.

19. The non-transitory computer-readable storage medium of claim 17, wherein the PRN is generated by a PRN generator initialized by the secret key used for the scrambling process.

20. The non-transitory computer-readable storage medium of claim 17, wherein the executable instructions which cause the computer to descramble receive a maximum value of the PRN.

* * * * *